March 22, 1949.　　　　E. WILDHABER　　　　2,464,913
METHOD AND APPARATUS FOR PRODUCING
CLUTCHES AND THE LIKE
Filed April 3, 1944　　　　　　　　　　5 Sheets-Sheet 1

Inventor
ERNEST WILDHABER
By
Attorney

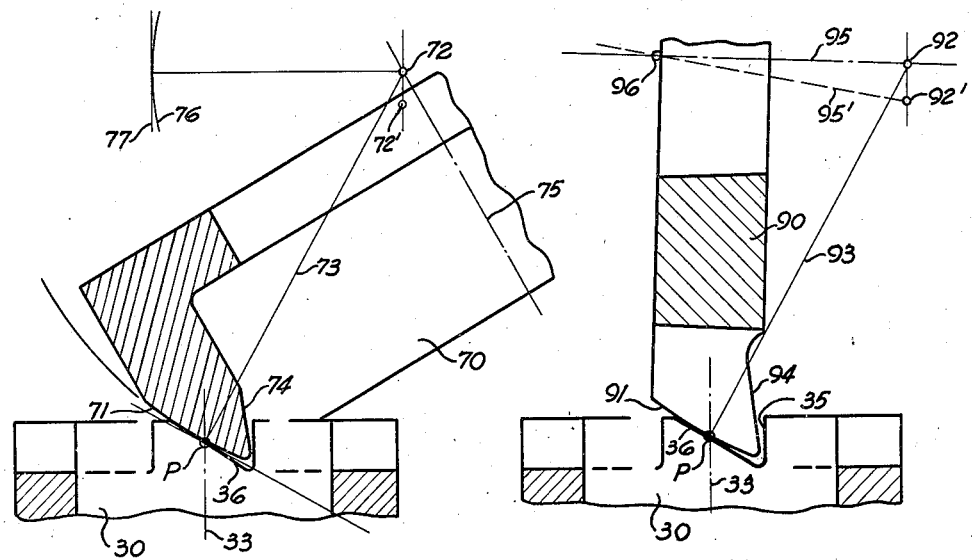
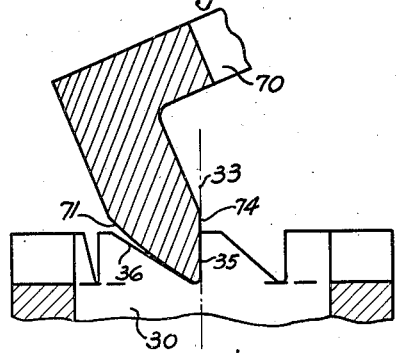
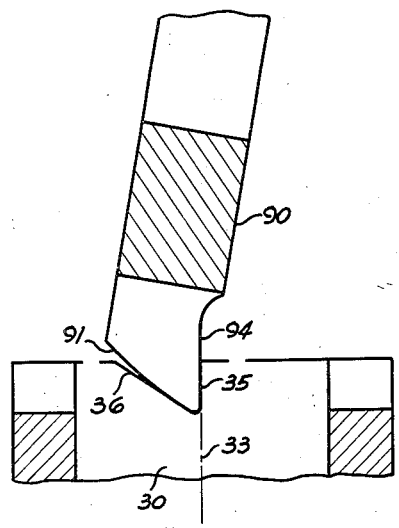
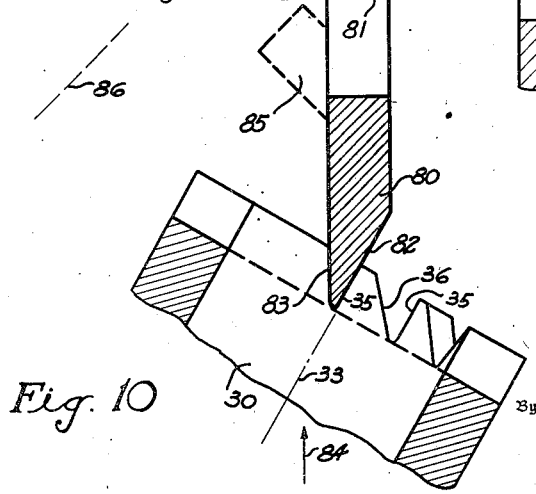
Inventor
ERNEST WILDHABER
Attorney

March 22, 1949.　　　　E. WILDHABER　　　　2,464,913
METHOD AND APPARATUS FOR PRODUCING
CLUTCHES AND THE LIKE
Filed April 3, 1944　　　　　　　　　　5 Sheets-Sheet 3

Inventor
ERNEST WILDHABER
By
Attorney

Inventor
ERNEST WILDHABER

March 22, 1949.  E. WILDHABER  2,464,913
METHOD AND APPARATUS FOR PRODUCING
CLUTCHES AND THE LIKE
Filed April 3, 1944  5 Sheets—Sheet 5

Inventor
ERNEST WILDHABER
By
Attorney

Patented Mar. 22, 1949

2,464,913

UNITED STATES PATENT OFFICE 2,464,913

METHOD AND APPARATUS FOR PRODUCING CLUTCHES AND THE LIKE

Ernest Wildhaber, Brighton, N. Y., assignor to Gleason Works, Rochester, N. Y., a corporation of New York Application April 3, 1944, Serial No. 529,337

31 Claims. (Cl. 90—9.4)

1

The present invention relates to the production of saw-tooth clutches, face ratchets, load-releasing clutches, and the like, and generally to the production of toothed face members whose teeth have helical side surfaces on one or both sides thereof.

Heretofore, on account of the warped configuration of their surfaces, the helical sides of clutch teeth and the like have been cut with a point-cutting tool, the tool being moved across the face of the work while a relative helical motion is produced between the tool and the work about and in the direction of the work axis. To obtain sufficiently smooth surfaces on the sides of the teeth with this process, a great number of passes of the cutting tool must be made across the helical side tooth surface from top to bottom thereof. In each pass, the point of the cutting tool cuts only a line lengthwise of the clutch tooth. As a consequence, the process is comparatively slow. Moreover, the tool is subject to rapid wear, particularly in the case of a grinding wheel, because the finishing cuts on the side tooth surface are all taken by a single point in the cutting tool.

One object of the present invention is to provide an improved method for generating the helical sides of the teeth of toothed face members, which will be faster than the methods heretofore employed.

Another object of the invention is to provide a process for generating the helical sides of the teeth of face members of the type described with which improved tooth surface finish can be obtained in relatively fast cutting time.

A further object of the invention is to provide a process for producing face members of the type described in which the cutting or grinding of the helical sides of teeth may be done with a side-cutting instead of a point-cutting tool, with the result that the tool employed will have longer life and smoother tooth surfaces may be obtained.

A further object of the invention is to provide a method for generating in a single operation both sides of the teeth of a saw-tooth or load-releasing clutch, or the like, with correct lengthwise taper.

Another object of the invention is to provide a method whereby the engaging tooth surfaces of the two members of a saw-tooth or load-releasing type clutch may be cut to have less than the full length of tooth contact and less than full profile contact, so that undue concentration of the tooth bearing at the ends of the teeth or at the tops of the tooth profiles may be avoided

2 when the clutch members are in engagement or are moving into or out of engagement.

Another object of the invention is to provide an improved form of cutting tool especially suited for practicing the process of this invention which is relieved in a novel way to provide a constant cutting shape throughout its life.

Still another object of the invention is to provide a machine suitable for producing toothed face members according to the method of the invention.

Other objects of the invention will be apparent hereinafter from the specification and from the recital of the appended claims.

As already indicated, in the process of the present invention, the helical sides of the teeth of a face member are produced by a side-cutting tool. Preferably a rotary tool is used having a side cutting surface or surfaces inclined to its axis. Either a rotary cutter or a grinding wheel may be used. In the case of a rotary cutter, the cutting surface of the tool is the surface of revolution which contains the cutting edges of the tool, while in the case of a grinding wheel, the cutting surface is its grinding surface. A grinding wheel has an infinite number of cutting edges and, therefore, when the term "cutter" is employed hereinafter either in the specification or the claims, it is intended to include a grinding wheel, and the term "cutting surface" is intended to include the surface of a grinding wheel as well as the surface containing the cutting edges of a cutter.

In cutting a toothed face member according to the present invention, the tool is revolved in engagement with the work while a relative helical motion is effected between the tool and the work and while simultaneously a relative swinging motion is effected between the tool and work about an axis inclined and preferably perpendicular to both the tool and work axes. The helical motion may be similar to that previously employed in the production of saw-tooth and load-releasing types of clutches. The swinging motion permits the side surface of the cutting tool or wheel to generate the tooth surface for the full depth of the teeth. The cutting surface of the tool may be of either straight or curved profile. Where a curved profile tool is employed it is preferably made of circular arcuate profile shape. The center of profile curvature may be on the tool axis or offset therefrom. In the former case, the active side surface of the tool is spherical, and in this case, the axis of swing of the tool will preferably be made to pass through the center of the spherical surface.

The teeth of saw-tooth clutches and face ratchets have helical surfaces at one side only. The other sides of the teeth are surfaces of revolution having profiles extending in the direction of the axis of the clutch. Nevertheless, with the present invention, both sides of a tooth space may be finished in a single operation. During feed and swing of the tool into depth, the helical side of a tooth space is finished with one side-cutting surface of the tool, and after the tool has reached full depth, the tool is allowed to dwell there long enough to finish the opposite side of the tooth space with the opposite side-cutting surface of the tool.

Both members of a saw-tooth clutch may be cut in the same way. By slightly varying the profile shapes of the cutting surfaces of the tools, full control can be had over the lengthwise and profile contact or bearing between mating surfaces of the clutch members. The cutter or grinding wheels used may be of the disc, dished or annular (face mill) type. When dished or annular type tools are used, the non-helical or axially extending sides of the clutch teeth will have convex lengthwise shapes, because they are produced by the inside cutting surfaces of the tools. In some instances, when the two clutch members so made are engaged, there will then be too much localization of lengthwise tooth bearing. This may be overcome by cutting the non-helical or axially extending side of one clutch member in a separate operation from that in which the helical sides of a tooth are cut and with a tool having a convex cutting surface which will produce a longitudinally concave surface on the clutch member.

Both sides of the teeth of load-releasing clutches are helical surfaces. In cutting or grinding such clutches by the method of the present invention, preferably a face-mill cutter or annular grinding wheel is used, and the tool is so positioned as to operate simultaneously in two spaced tooth zones of the work. One side of one tooth space is ground on the in-feed of the tool and the opposite side of a tooth spaced from the first tooth is ground on the out-feed. The work rotates continuously in the same direction during both inward and outward feed movements. The swinging motion is in one direction during the in-feed and in the opposite direction during the out-feed.

It is possible to practice the present invention on certain known types of bevel gear cutting machines which have means for tiltably adjusting the cutter and for effecting a generating roll between the cutter and work during cutting. I have, however, also devised a machine which is especially intended for the purpose and which has simple means for effecting swinging movement of the cutter or grinding wheel in time with the rotation of the work on its axis, and in time with relative feed of the cutter in the direction of the work axis.

The cutters used in one embodiment of the present invention have widely different pressure angles on opposite sides. To maintain constant profile shape throughout the life of such tools, I preferably provide the blades with a novel relief which is in a direction approximately bisecting the angle included between opposite side-cutting edges of the tool.

In the drawings:

Fig. 8 is a sectional view similar to Fig. 3 but illustrating diagrammatically one position in the grinding of a helical side tooth surface according to the invention with a rotary annular grinding wheel;

Fig. 9 is a view similar to Fig. 4, illustrating the further and final position in the grinding of this surface with an annular wheel;

Fig. 10 is a sectional view, showing how the non-helical or zero pressure angle side of a tooth of a clutch may be formed in a separate operation to have a longitudinally concave shape;

Figs. 11 and 12 are sectional views corresponding to Figs. 8 and 9, respectively, and illustrating diagrammatically how opposite sides of a tooth space of a saw-tooth clutch may be cut in one operation according to this invention so that mating clutch members may have any desired amount of lengthwise tooth bearing;

Figures 16, 17, 18, 19, 20:
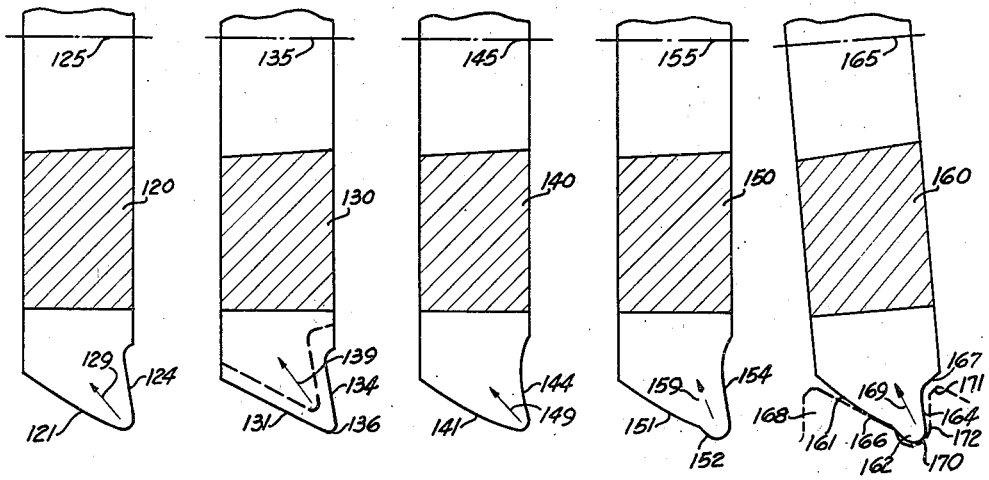
Figure 21:
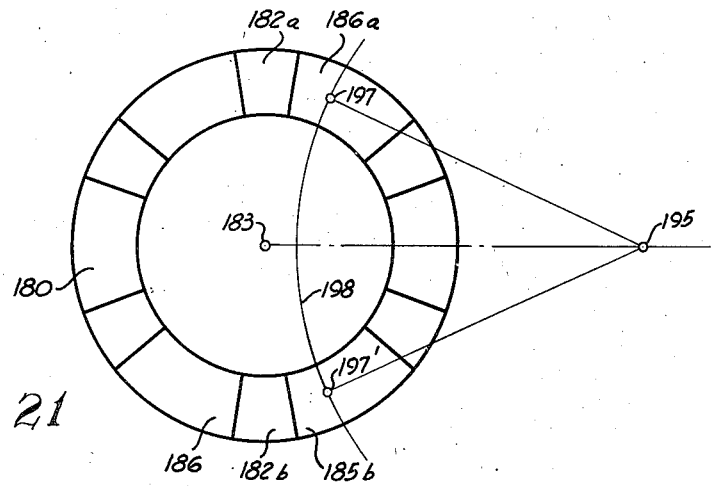
Figure 22:
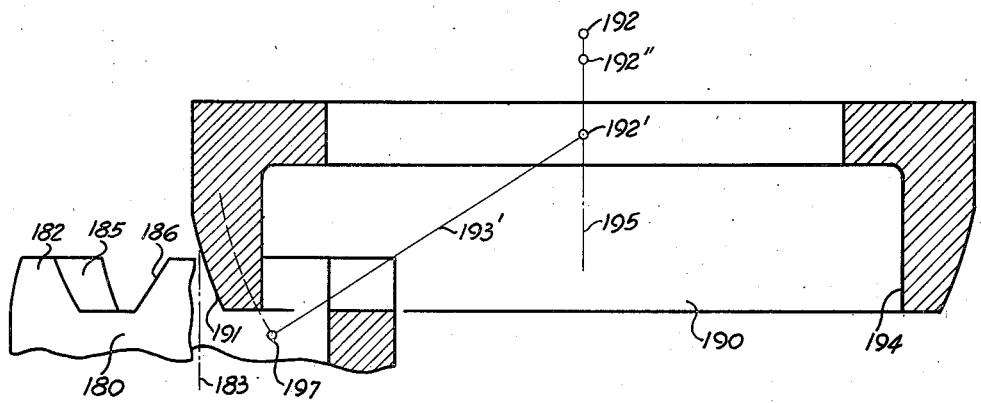
Figure 23:
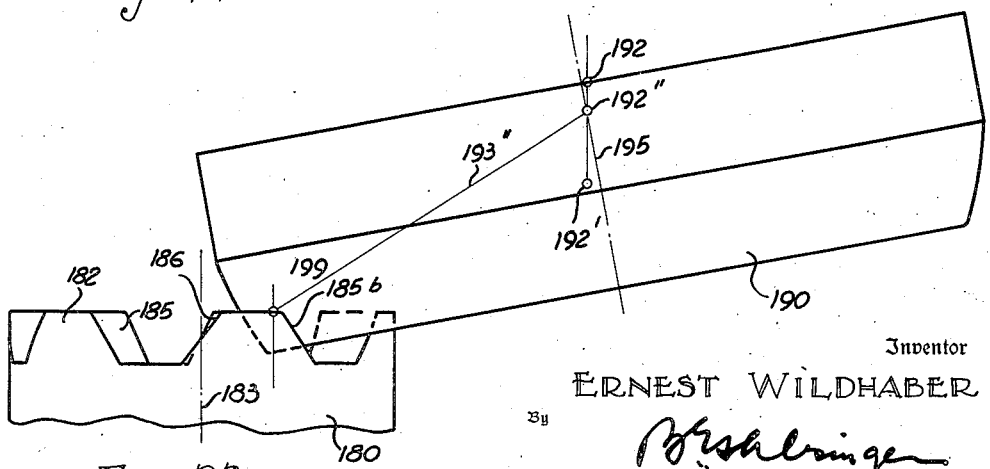
Figure 24:
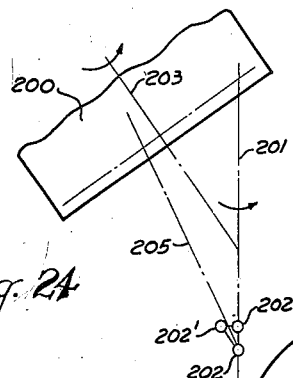
Figure 25:
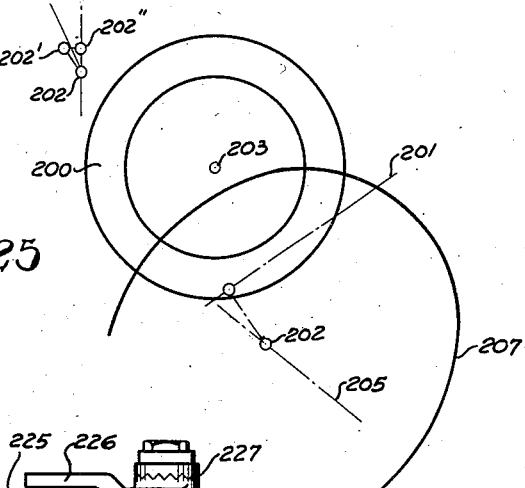
Figure 26:
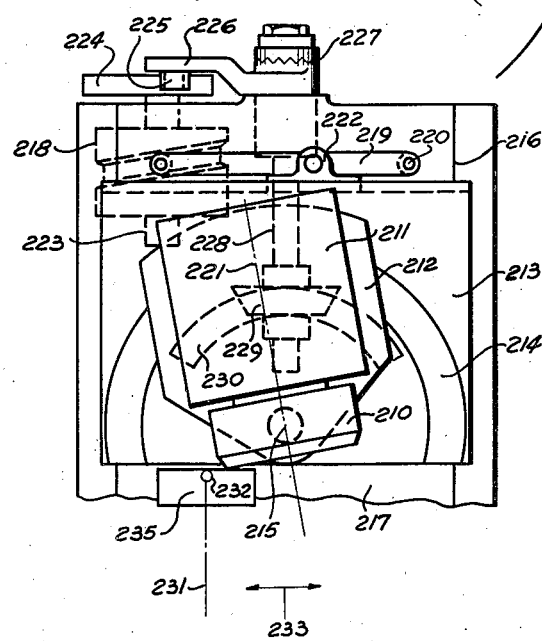

Figs. 16 to 20 inclusive are fragmentary axial sectional views of cutters made according to further modifications of the invention, Fig. 20 illustrating diagrammatically also, how the cutter of this figure may be employed to produce a saw-tooth clutch member having rounded tooth bottoms and chamfered tooth tops;

Fig. 21 is a plan view of a double helical or load-releasing clutch member made according to this invention, showing, also, diagrammatically the principles underlying the production of this clutch member according to the present invention;

Fig. 22 is a part elevational, part sectional view further illustrating one method of producing this clutch member and showing the cutting tool in full depth cutting position;

Fig. 23 is an elevational view still further illustrating the production of this clutch member and showing the cutting tool in another position;

Figs. 24 and 25 are diagrammatic views in plan and in elevation, respectively, and illustrating diagrammatically the principles on which a clutch member may be cut on a standard type of gear-cutting machine by the process of the present invention; and Fig. 26 is a fragmentary plan view, illustrating diagrammatically the structure of a machine built according to one embodiment of this invention especially for cutting or grinding toothed face members according to the principles of the invention.

In the drawings, 30 and 31 denote, respectively, the two members of a saw-tooth clutch constructed according to one embodiment of this invention. Each has teeth 32 which extend in the general direction of the clutch axis 33, but whose opposite sides 35 and 36 are unsymmetrical. The sides 35 have straight profiles parallel to the clutch axis 33 while the opposite sides 36 are inclined at a relatively large angle to the clutch axis. The sides 35 are surfaces of revolution, while the sides 36 are helicoidal surfaces and, in the instance shown, are right helicoids having radial direction in any section perpendicular to the clutch axis 33. Thus, the top line 37 of a helical tooth side 36 is straight and radial of the clutch axis 33. The side surfaces 35 of the teeth may also be made longitudinally straight and radial of the clutch axis 33, but in the embodiment shown are of longitudinally convex shape.

Figure 3:
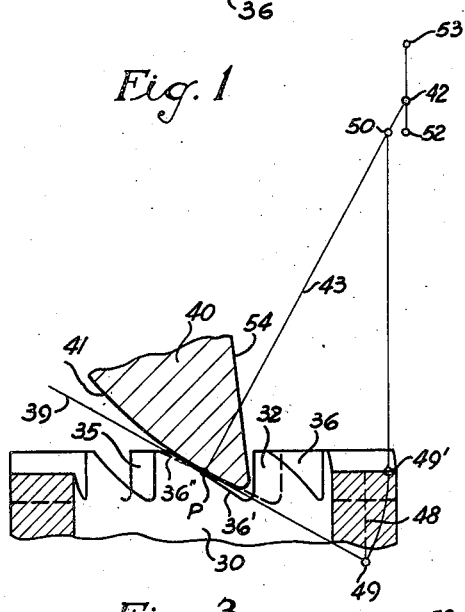
Fig. 3 is a fragmentary sectional view, illustrating somewhat diagrammatically the process of cutting the helical side of a tooth according to this invention and showing the cutting tool in one position of its engagement with the work.

As is well known, the lead angle λ of a helicoid varies with the distance of the considered point away from the axis of the helicoid. It is larger at the inside of a tooth as illustrated in Fig. 3 where the inside profile of a helical side of a tooth is shown in full lines and denoted at 36′, and it is smaller at the outer end of a tooth as indicated by dotted line 36″ which denotes the outside profile of the tooth side.

A right helicoid of constant lead is fully defined by its lead L. The lead angle λ at any distance R from the axis of the helix is known to be:

$$\tan \lambda = \frac{L}{2\pi R}$$

The inclination of the tangent 39 to the helical surface at a mean point P in the tooth surface may be computed from the above equation by introducing the proper value of R, namely, the distance 33—P.

Fig. 3 illustrates the difficulty of generating helical tooth sides of toothed face members with a side-cutting tool by any previous known process. It also illustrates a position in the generation of a helical tooth side by the method of the present invention. Here the helical side to be generated is denoted at 36 and the side-cutting tool to be used is denoted at 40. The cutting tool 40 has a convex spherical side-cutting surface 41. In Fig. 3, this spherical cutting surface 41 is shown in contact with the helical tooth side 36 at the mean point P. The center 42 of the spherical cutting surface is located on the surface normal 43 and, of course, on the axis of the cutting tool. The spherical cutting surface is made of sufficiently large radius so that it will touch the desired helicoid not merely at the mean point P but will very closely follow that surface. There is one sphere which gives the best fit and which will be called the curvature sphere. It can be determined by layout or by computation.

Figure 5:
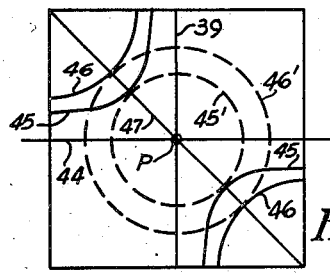
Fig. 5 is a diagrammatic view in the nature of a topographic map, showing how the tool and a helical tooth surface produced contact one another in a plane tangent to the tooth surface and in planes parallel thereto, when the tooth surface is cut according to one embodiment of the invention.

Fig. 5 is a view of the plane tangent to the helical surface 36 at the mean point P and containing both the helix tangent 39 and the radius 33—P. The view of Fig. 5 is a huge enlargement of only a small portion of the tooth surface and illustrates the condition where the center of the spherical cutting surface coincides with the center of the curvature sphere. Here, the tooth surface intersects the tangent plane in asymtotes 39 and 44, and reaches through the tangent plane in the upper left hand corner and the lower right hand corner. To define further the helical tooth surface, I have also drawn lines 45 and 46 of constant elevation of the tooth surface above the tangent plane. They are like lines of constant altitude in topographical maps. The curvature sphere is of such a dimension that the lines of constant elevation 45′, 46′, of the sphere touch the corresponding lines 45, 46. The lines 45, 45′ and 46, 46′ have the same elevation, respectively, that is, they represent intersections with the sphere and helical side tooth surface of planes parallel to the tangent plane. The line 47 is then the projected line of contact between the curvature sphere and the helical side tooth surface.

It can be demonstrated mathematically that the sphere radius ρ of the curvature sphere of a right helicoid is:

$$\rho = \frac{R}{\sin \lambda \cos \lambda}$$

Figure 1:
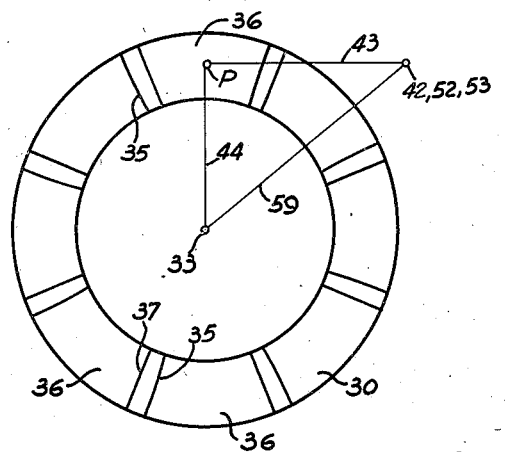
Fig. 1 is a plan view of a saw-tooth face clutch member made according to one embodiment of this invention.
Figure 2:
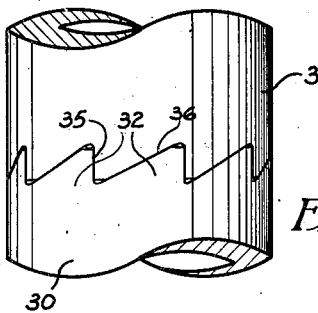
Fig. 2 is a side elevational view showing two such clutch members in engagement.

This lends itself to a simple graphical construction: Draw the line 48 (Fig. 3) parallel to the clutch axis 33 and at the mean clutch radius 44 (Fig. 1) from the clutch axis. Then rotate the intersection point 49 of line 48 with tangent 39 about the mean point P to a position 49′ in a plane containing point P and perpendicular to the clutch axis 33. The center 50 of the curvature sphere is then the axial projection of the point 49′ to the normal 43.

Usually, a somewhat larger sphere radius is preferred, that is, it is usually preferred to have the sphere center at point 42 rather than at 50 in order to ease off the helical tooth surfaces at their ends so as to obtain localization of tooth bearing between the engaging surfaces of mating clutch members.

Figure 6:
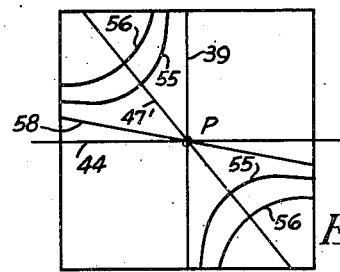
Figs. 6 and 7 are corresponding views showing the nature of contact when the tooth surfaces are made according to still further modifications of the invention.

Fig. 6 is a view illustrating the conformation of a helical side tooth surface when a spherical cutting surface of larger radius than the radius of the curvature sphere is used to generate the helical tooth surface, as is the situation when the sphere center is at 42. Here, the helical tooth surface intersects the tangent plane at mean point P in lines 39 and 58 which form asymtotes for the curves 55 and 56 of constant elevation. Contact between the curvature sphere and the helicoid is then along the line 47′.

Figure 7:
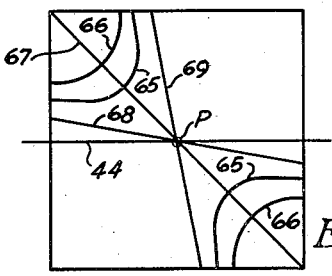

The helical surfaces illustrated by Figs. 5 and 6 are of uniform lead. Fig. 7 illustrates the structure obtained when the profile of the cutting surface is reduced in curvature to such an extent that its center no longer lies on the axis of the cutting tool. In this case, the cutting surface is no longer spherical and a helical surface of slightly varying lead will be obtained. Such a surface has a slightly convex profile shape and is also slightly eased off at the outside and inside ends of the teeth. It can be considered as a helicoid of constant lead eased off at both the tops and the bottoms of its profile and at the outside and inside ends thereof. It can be obtained with the same motions and setting as described for helicoids of constant lead by simply modifying, as stated, the profile of the cutting surface. Here 68 and 69 are the asymtotes for the curves 65 and 66 of constant elevation, and 67 is the line of contact between the tangent plane and the helical tooth surface.

The curvature of the cutting profile can be still further reduced and frequently even a straight cutting profile may be used provided the axis of rotation of this profile still intersects the normal 43 to the helical tooth surface in point 42. In fact, tools having straight cutting profiles may be preferred for face clutches and face ratchets of small diameter and even in other cases unless the localization of bearing becomes too great. A tool having a straight cutting profile is usually less costly than a tool having a spherical cutting profile.

Regardless of the shape of the side-cutting surface of the tool, basically, a helical tooth side 36 is produced by a relative helical motion between the cutting tool and the work about and along the work axis 33 at a given lead L. While this will generate a helical surface of the proper shape, it will not generate the helical side tooth surface for its full height. Fig. 3 shows a position where the helical side tooth 36 is generated to the line of contact 47 (Fig. 5), namely, to the mean contact point P. Below point P, the tooth surface at this stage will only be a counterpart of the spherical cutting surface 41. To completely generate the helical surface 36, the spherical cutting surface 41 must be moved further depthwise, that is, the sphere center 42 must be moved further depthwise to a position such as that at 52 in Fig. 3. A simple depthwise movement, however, cannot be performed because then the spherical surface would cut away the tooth bottom and cut too deep. This will explain why side-cutting tools have not heretofore been used for cutting helical side tooth surfaces of toothed face members, and why point-cutting tools have heretofore been employed for this purpose.

I have solved the problem of generating a helical surface for its full height with a side-cutting surface by tipping the cutting tool about an axis angularly disposed to the tool axis. For instance, when a tool 40 having a spherical cutting surface 41 is used, the tool is tipped about the center 42 of the spherical cutting surface 41 as the work rotates on its axis and as in time therewith the tool is fed depthwise into the work. The tipping movement is such that at the zone of engagement of the cutting surface 41 and the helical surface 36, the cutting surface is lifted upwardly, so that at said zone the depth feed is smaller than the feed of the sphere center and approaches zero. The cutting surface may be tipped about an axis passing through the sphere center 42 and perpendicular to the clutch axis 33 and to the plane of the drawing of Fig. 3.

Figure 4:
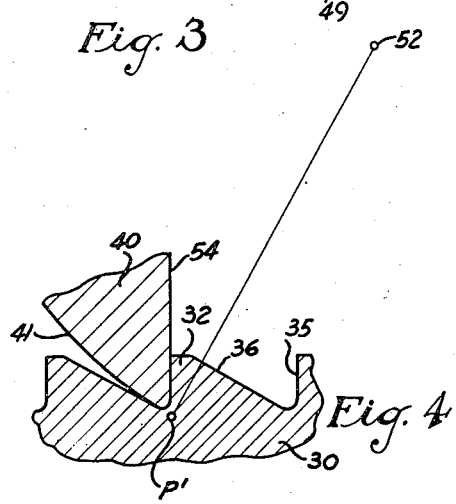
Fig. 4 is a fragmentary sectional view further illustrating the process and showing the cutting tool in the final or full-depth position of its engagement with the work.

Fig. 4 illustrates the final position of the cutting tool 40 with such tipping movement about the sphere center. Here the clutch teeth are shown in a mean section passing through mean point P. In this figure, the sphere center has reached its final depthwise position 52 and the cutting tool has been tipped upwardly from the position shown in Fig. 3. Contact between the extended mean helix of surface 36 and the cutting surface 41 is now at a point P' which is below the root surface of the clutch. The helical surface is now completely generated for its full height.

Where a saw-tooth clutch is to be produced, the opposite side of the tooth space may now be finished by the cutting surface 54 of the tool when the tool is in full depth position. For this purpose, the tool may be allowed to dwell at full depth long enough to complete tooth side 35. The cutting surface 54 may be plane or conical.

When a helical side surface 36 has been generated for its full height and opposite tooth side 35 has been finished, the depthwise feed movement is reversed. The swinging movement about the sphere center may, however, continue in the same direction as during the in-feed until the cutting surfaces are clear of both side 36 and side 35 of the tooth space. Then the tool may be moved clear of the work by straight out-feed. When the tool is clear, the work may be indexed to bring another tooth space into position to be cut.

The depthwise feed of the cutting tool may start at a position 53 (Fig. 3) of the sphere center and end when the position of the sphere center has arrived at position 52. It is to be noted that in the movement from the position shown in Fig. 3 to that shown in Fig. 4, the periphery of the cutting tool 40 has moved depthwise only a fraction of the distance of travel of the center of the cutting surface from point 42 to point 52.

Preferably, the in-feed movement is at a uniform rate and the work is turned on its axis during said in-feed movement at a corresponding uniform rate. The rate of rotation of the blank may be different, however, during the out-feed movement, when the tool is out of cutting engagement with the blank, so as to minimize the amount of time required for indexing.

It is not absolutely necessary that the swinging movement be about an axis perpendicular to the plane of Fig. 3. It may be about some other axis passing through this sphere center 42 as, for instance, an axis 59, shown in projection in Fig. 1 which intersects the clutch axis 33 in a plane containing the point of contact P and which passes through the sphere center 42, or an axis inclined at an acute angle to the drawing plane of Fig. 3 and projecting into the line 53—52 of that figure. All that is required is that the axis be so located that a swinging motion about it changes the depthwise position of the cutting surface 41 at the zone of cutting engagement so as to enable that cutting surface to reach down to the bottom of the tooth space and generate the helical side surface of this space for the full height of that surface.

The cutting tool itself may be of disc type, dished type, annular type, or any other suitable type. Figs. 8 and 9 illustrate an embodiment of the invention in which a rotary annular grinding wheel is employed to grind, according to the principles of the invention, the saw-tooth clutch 30 after the tooth spaces of the clutch have been cut and hardened. The grinding wheel is here denoted at 70. Its axis is at 75. It has an outside spherical grinding surface 71 and an inside conical grinding surface 74. 73 denotes a normal to the outside grinding surface 71, and 72 is the center of curvature of this surface.

In grinding the helical sides 36 of the teeth of a clutch member 30, such as shown in Figs. 1 to 4 inclusive, the grinding wheel 70 is rotated on its axis 75 while a relative helical motion is produced between the wheel and the work about and in the direction of the work axis 33 and while a relative swinging motion is produced between the wheel and the work about an axis passing through the sphere center 72. The axis of swing is here offset from and angularly disposed to the work axis. Fig. 8 illustrates a position where contact between the outside surface 71 and the helical tooth surface 36 is at mean point P of the tooth surface. Fig. 9 shows a position where the grinding wheel has reached full depth. The helical side surface 36 has here been completely generated and a driving side surface 35 is being ground with the inside surface 74 of the wheel.

When both members of a clutch pair or of a pair of face ratchets are ground in the manner described, they will engage with one another correctly on both sides. The meshing helical sides 36 of the teeth will have the lengthwise and profile contact which is desired and which is determined by the sphere radius of the outside cutting surface 71 of the grinding wheel. The driving sides 35 of the teeth, while adapted to contact at their centers, will have, however, their tooth ends eased off to a degree which is only under limited control and which, for clutches or ratchets having very wide face width, may exceed the desired amounts. This is because the inside conical surface of the grinding wheels will grind convex lengthwise shapes on both members. In such cases it may be desirable or sometimes necessary to lengthen the bearing area of the driving sides by grinding the driving sides of at least one member of the clutch or ratchet pair in a separate operation.

Fig. 10 illustrates one way in which this may be done. Here a grinding wheel 80 is employed that is of disc form and that is rotatable on an axis 81 and has a convex conical grinding surface 82. Its opposite side surface 83 may be a plane surface perpendicular to the axis 81 of the wheel, and does no grinding. The clutch member 30, which is to be ground, is set at an angle to the direction 84 of depthwise feed movement, and grinding is effected simply by rotating the grinding wheel on its axis 81 while effecting depthwise relative feed between the tool and the work in the direction of the arrow 84, namely, in a direction inclined to the cutting edge 82 of the grinding wheel at the angle required to produce the desired profile shape on the side tooth surface 35. The feed motion may be a rapid advance to depth just outside of grinding contact, followed by a slower grinding feed until full depth position is reached. The feed is then rapidly reversed and the work is indexed when clear of the wheel. Through use of wheel 80 it is possible to grind the driving sides 35 of one member of the clutch pair so that it will have concave lengthwise curvature and so that when the two clutch members are engaged, their driving sides 35 will have the desired amount of lengthwise contact.

Instead of disc wheel 80, a cupped wheel may be used for grinding driving sides 35. The body portion of such a wheel is denoted at 85 in Fig. 10 and its axis at 86. The active grinding surface of the wheel is an external conical surface whose profile coincides with the profile of the grinding surface 82 of the disc wheel. The cupped wheel should be of such shape that its axis 86 may be inclined to the work axis 33 at such an angle as to avoid interference of the wheel with the teeth of the work at a point away from the zone of working engagement. Again a side surface 35 may be produced by rotating the wheel on its axis while effecting feed between the wheel and work in a direction 84.

The same problem is encountered in cutting the driving sides of a saw-tooth clutch with a face mill cutter as in grinding with an annular grinding wheel. Here, also, two operations may be required on one member of the clutch pair in order to obtain a suitable amount of lengthwise contact on the engaging surfaces of the mating clutch members.

Figs. 11 and 12 illustrate an embodiment of the invention in which each member of the clutch or ratchet pair is cut in a single operation and where the mismatch or lengthwise localization of tooth bearing is under complete control on both sides of the teeth. Both clutch members are here made alike and may be made to contact at the middle of their teeth on both sides and with as long a tooth bearing as is desired. Fig. 11 shows a position similar to those shown in Figs. 3 and 8, while Fig. 12 shows a position similar to those shown in Figs. 4 and 9. Here a disc cutter 90 is employed that has the same general V-shape cutting profile as the wheel 70 of Fig. 8 or the tool 40 of Fig. 3. It has a spherical cutting surface 91 at one side whose center is at 92 on normal 93 which intersects the axis 95 of the tool in point 92. It has a cutting surface 94 at its opposite side which is conical and slightly internal; in fact, so slightly internal that in the area of cutting it differs only very slightly from a plane, the difference being just enough to produce the desirable amount of mismatch of the driving sides of the clutch or ratchet teeth at the outer and inner ends of the teeth. If no mismatch were desired, the cutting surface could be made plane perpendicular to the tool axis 95. It will be noted that in the embodiment shown the center 92 of spherical side-cutting surface 91 lies on the axis 95 of the cutter beyond one side face of the cutter and beyond the plane which is adjacent said side face and which contains the tip cutting points of the tool.

The tool 90 is employed in the same way as the tools 40 and 70 previously described. It is rotated on its axis 95 in engagement with the work and simultaneously a relative helical motion is effected between tool and work about and in the direction of the work axis 33 while a relative swinging movement is produced between the tool and work about an axis passing through the sphere center 92 and preferably perpendicular to the plane of the drawing of Fig. 4 and also perpendicular to the work axis 33. In the position shown in Fig. 11, spherical cutting surface 91 of the tool has contact with the helical side surface 36 being generated in mean point P, while in the position shown in Fig. 12, the helical side surface 36 is completely generated and the driving side 35 of the tooth space is being finished. Here, the conical surface 94 of the tool will produce a longitudinally convex surface on the side 35 of the tooth, but the degree of convexity is fully under control and may be made such as to obtain a desirable amount of lengthwise tooth contact when the pair of engaging clutch or ratchet members are in mesh.

Ordinarily the speed of cutter rotation is independent of the helical and swinging movements. In some cases where high speed production is sought, it may be desirable, however, to time the cutter rotation with the helical and swinging motions so that the same blade of the cutter may finish the driving sides of all of the teeth of the clutch or ratchet member, to insure accurate tooth spacing. The swinging motion is timed with the depth feed motion, but the exact nature of the timing is relatively unimportant provided that it is the same for each tooth surface to be produced. The timing may be such that the cutter axis 95, or a line parallel to it, continues to pass through a fixed point, such as point 96, during the swinging motion. This is shown in Fig. 11 where 95' denotes another position of the tool axis 95. The swinging motion and the depth feed motion may, however, be timed to be in exact proportion to each other. In this case, a circle connected with the carrier, in which the wheel is journaled, will roll on a straight line parallel to the work axis. Such an embodiment is illustrated diagrammatically in Fig. 8 where 76 denotes said circle and 77 said line parallel to the work axis. Such timing may be effected for instance by use of a rack and gear or the equivalent thereof. If this timing is retained during the out-feed motion, we may rely on the reversal of the work rotation at full depth position to get the cutter or grinding wheel clear of the grinding side of the work, or the wheel 70 might be withdrawn axially and advanced again before the start of the next grinding cycle. We may, however, also control one or both feed motions by cam means. In this case, the timing of the feed and swinging motions is not required during the withdrawal motion. Then the swinging motion is made to continue in the same direction until the tool and work are sufficiently clear of each other.

Cutters of the general character shown in Figs. 11 and 12 may be made in various forms, as illustrated in Figs. 13 to 20 inclusive.

Figures 13, 14, 15:
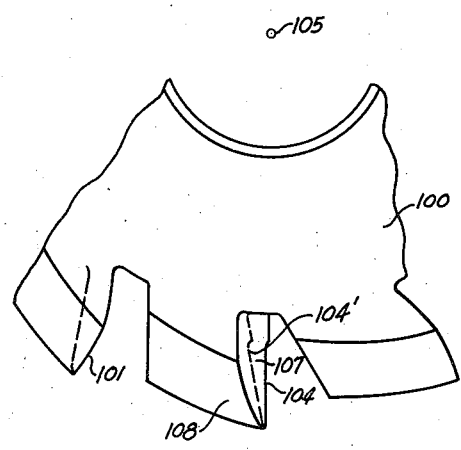
Figs. 13 and 14 are a fragmentary side elevation and an axial sectional view, respectively, illustrating one form of cutter made according to the present invention for practicing the process of the invention.
Fig. 15 is a fragmentary axial sectional view of a cutter made according to a different embodiment of the invention.

The cutter 100 shown in Figs. 13 and 14 is of the disc type and has a plurality of radially disposed cutting blades, each of which has a generally V-shaped cutting portion comprising a curved profiled cutting side 101 and a straight profiled cutting side 104. The straight profiled cutting sides 104 are inclined at such an angle to the cutter axis 105 as to form a slightly internal conical cutting surface. The curved profiled cutting portions 101 are of circular arcuate shape and have their centers on the cutter axis, constituting, therefore, a spherical cutting surface. The two cutting surfaces 101 and 104 of each blade are connected by a rounded tip cutting portion 106.

The front cutting faces 107 of the cutting blades of cutter 100 are preferably plane surfaces. In Fig. 13, the cutter is shown as having the front faces of alternate blades sharpened with opposite side rake so that one blade will have a side-cutting edge 104 at one side and the next blade will have a side-cutting edge 101 at the opposite side. This structure insures keener side-cutting edges. Instead of so sharpening the cutter, however, its cutting faces may be sharpened all alike. The cutting faces may be ground so that the cutting edges lie in planes containing the cutter axis 105, but it is preferred to provide each cutting face with a slight hook in addition to its side rake. Thus, the straight side cutting edge instead of being at 104 might be at 104' as shown in dotted lines in Fig. 13 for the blade 108 of the cutter. By providing the blades with such a hook and also with a slight side rake favoring the side 104, all of the blades might be ground alike and the cutter would still have keen cutting action.

On form-relieved milling cutters constructed according to conventional design, the profile of the relieving tool is identical with the cutting profile which is to be relieved, that is, it is a counterpart of the profile of the cutter in an axial plane of the cutter. The face of the relieving tool is then a plane positioned to contain the cutter axis. The relieving motion is in said plane. When front rake or side rake is provided on the cutter, the face of the relieving tool may be made to coincide with the cutting face and the profile of the relieving tool is then made to conform to the cutting edge and differs from the cutting profile.

In the manufacture of cutters according to the present invention, the relief may be applied to each cutting surface by a single-edged tool on a relieving lathe. A straight-line relieving motion is then imparted to the tool as the cutter is turned on its axis, and as in conventional practice, the relieving motion is repeated for each cutting tooth or blade to be relieved. The relieving motion, however, is in a direction, such as denoted by arrow 109 in Fig. 14, which substantially bisects the angle of the basic V-shaped cutting profile, so as to insure approximately equal amounts of normal relief on the two sides of the blades. In all cases, the relieved surfaces are so shaped that the cutting profile remains the same during the whole life of the cutter. This is illustrated in Fig. 14 where a cutting profile, such as might be obtained after repeated sharpenings of the cutter, is shown in dotted lines. The cutting edges 101, 104 and 106, respectively, then assume the positions 101', 104' and 106', respectively.

Fig. 15 shows a disc cutter 110 designed according to this invention and having inserted cutting blades 112, which are secured in slots 113 of the cutter head by bolts 115. Such cutters may be used especially for cutting clutches of large size. Here again, the cutting profile of the blade in the axial section of the cutter is of general V-shape, the blades having side-cutting edges 111 of circular arcuate profile shape centered on the cutter axis, side-cutting edges 114 of straight profile shape inclined to the cutter axis and connecting tip cutting edges 116 of curved shape. The side-cutting edges 111 again constitute a spherical cutting surface and the side-cutting edges 114 again constitute a conical cutting surface coaxial with the cutter. The cutting blades are again relieved preferably in a direction bisecting the cutting profile as indicated by the arrow 119.

Still another form of cutter is shown in Fig. 16. Here the cutter 120 has a convex cutting profile 121 which is less curved than the profile 101 of the cutter 100 and which has its center beyond the cutter axis 125 so that the cutting surface is no longer a spherical surface. The opposite side cutting portion 124 may be, however, of straight profile like the cutting portion 104.

The cutter 130 of Fig. 17 has straight cutting profiles 131 and 134 at opposite sides, constituting a V-shape cutting portion connected by the rounded tip portion 136. The axis of the cutter is denoted at 135.

The cutter 140 of Fig. 18 has a convex profile 141 on one side and a concave cutting profile 144 on the opposite side. The axis of this cutter is denoted at 145.

The cutter 150 of Fig. 19 has a convex cutting profile 151 which bulges out near its tip, as denoted at 152. This is for the purpose of producing a round in the bottom of the tooth spaces of the clutch or ratchet member which is to be cut. The opposite side of the cutting portion of this tool is of straight profile as denoted at 154. The axis of the tool is at 155.

Fig. 20 illustrates a still further embodiment of the invention in which a cutter 160 is shown which is similar to the cutter 150 of Fig. 19 except for the fact that a chamfering edge 167 is provided at the top of the straight cutting profile 164. The opposite cutting profile 161 is again of circular arcuate profile shape and again has a bulge 162 near its tip. The use of this cutter is illustrated diagrammatically in Fig. 20. It is shown in the operation of cutting the helical side 166 of a tooth of a clutch member 168. During the relative movement of the cutter to full depth position, it will be swung, as in previous embodiments of the invention, about an axis passing through the center of curvature of the cutting side 161, and in this swinging movement the bulging portion 162 of the cutting edge will sweep out the rounded tooth space bottom 170. At the same time, the chamfering edge 167 will chamfer the upper edge 171 of tooth side 172.

All of the tools 120, 130, 140, 150, and 160 of Figs. 16 to 20 inclusive are preferably relieved in a direction approximately bisecting the angle included between the opposite side-cutting edges of the tools, as denoted by the arrows 129, 139, 149, 159, and 169 in these figures.

As has already been stated, the invention is not limited to the production of saw-tooth clutches, ratchets, or the like which have helical side tooth surface on one side only of their teeth, but may be applied also to the production of face members having helical surfaces on both sides of their teeth, as, for instance, overload clutches. One method for generating the side tooth surfaces of a double helical or overload clutch is illustrated diagrammatically in Figs. 21 to 23 inclusive. Here the clutch member is denoted at 180. It has teeth 182 whose opposite sides 185 and 186 are helicoidal surfaces, preferably right helicoids of equal lead and opposite hand. The axis of the clutch member is at 183.

For cutting or grinding the side tooth surfaces of clutch member 180, a rotary face-mill or annular grinding wheel 190 may be used which has a convex spherical outside grinding surface 191 whose sphere radius and radial position may be determined according to the principles already set forth. The inside surface 194 of the wheel may be of any desired shape as it is not a finishing surface. The tool, here shown as a grinding wheel, is positioned to operate in two spaced tooth zones of the work simultaneously. In operation, the wheel is rotated on its axis 195 while the work is rotated on its axis 183 preferably at a uniform rate, and while a relative feed movement is effected between the wheel and the work in the direction of the work axis 183 and while a relative swinging movement is effected between the tool and work about an axis passing through the center of curvature of the spherical cutting surface 191 of the wheel. One side surface of a tooth of the work is finished during feed of the wheel into full depth position and the opposite side surface of a spaced tooth of the work is finished during out-feed of the wheel. During the feed movement, the sphere center moves from an initial position, say at 192, to full depth position 192' and back again, and the work or wheel is swung first in one direction and then in the other about an axis passing through the sphere center.

In Fig. 22 the wheel is shown in full depth position. In this position the wheel axis 195 is parallel to the clutch axis 183 and, as illustrated diagrammatically in Fig. 21, a point in the operating surface of the wheel extended travels in a mean path 198. This is the changeover position from one side of one tooth of the clutch to the opposite side of another tooth of the clutch. In this limit position, contact is made between the extended spherical grinding surface 191 of the wheel and the mean helices of opposite sides 186a and 185b of spaced teeth 182a and 182b of the clutch at points 197 and 197', respectively. During the in-feed movement, the helical side surface of one tooth of the clutch, such as tooth surface 186a, is generated; during the out-feed movement, the clutch rotates on its axis from the position shown in Fig. 22 to that shown in Fig. 23, and the grinding wheel is swung outwardly about the axis passing through the sphere center, the side surface 185b is generated. During the out-feed movement, the swinging motion will be so timed to the feed that for any given depth position, the wheel will occupy the same position as during in-feed. Thus the opposite sides of the teeth may be generated alike. Fig. 23 shows a position at which the top point 199 of the mean helix of this surface is being ground. Here the normal is at 193'' and the sphere center is at 192''. The out-feed continues until the sphere center reaches a position 192 when the two helical sides which have been engaged during the generating cycle will have been ground.

After the generation of the two sides is complete, the clutch is withdrawn along its axis 183, or the wheel is withdrawn along its axis 195. The work is then indexed to bring a new pair of tooth sides into position to be ground or the work may be allowed simply to continue its uniform turning motion until a new pair of tooth surfaces have arrived in grinding position when the in-feed may begin again to begin a new cycle of operation.

In the described cycle, the wheel is fed into full depth position and then fed out again. However, a dwell at full depth position may be employed if desirable. The process is fast, accurate, and capable of giving an excellent finish on the helical sides which is quite important on overload clutches.

The invention may be practiced on a gear cutting machine having tilt adjustments for the cutter such as disclosed in the Carlsen Patent No. 2,300,240 of October 27, 1942. The manner in which such a machine may be used for the purpose is illustrated diagrammatically in Figs. 24 and 25. These diagrams show the production of a saw-tooth clutch having left hand helical tooth sides. The clutch member to be produced is denoted at 200. The work is positioned so that its axis 203 is inclined to the axis 201 of the cradle of the gear cutting machine, this angular position being required to get the cutter clear of the driving side of the clutch teeth during the return feed movement. In the cutting machine, the work axis 203 lies in a horizontal plane. To produce the desired type of clutch, the cutter is positioned to engage the work at a point below this plane. The cutter is of the face-mill type being similar in shape to the wheel 70 of Figs. 8 and 9. 195 denotes the cutter axis and 202 is the center of the spherical profile of the cutter.

Let us assume that during generation of the helical side, it is possible to have the depth feed in the direction of the work axis 203. In this case, the axis 201 of the cradle would have to pass through the sphere center 202 and the process of cutting would be in accordance with that illustrated in Figs. 1, 3, and 4 except that the axis of swing, which is the axis of the cradle, is disposed at an acute angle rather than at a right angle to the work axis. In the machine of the Carlsen patent, however, the feed motion is in the direction of the cradle axis. This means that in the case illustrated in Figs. 24 and 25, the feed cannot be in the direction of the work axis. To produce a correct tooth shape, however, the sphere center should move from position 202 to position 202' parallel to the work axis 203, but in the machine of the Carlsen patent it can only move from position 202 to position 202'' along the cradle axis 201. It is possible however to use the Carlsen machine by positioning the sphere center not on the cradle axis but in a horizontal plane below the cradle axis at a position so determined that through the cradle motion the sphere center will move from 202'' to 202' as the depth feed proceeds. In other words, the cradle motion is so determined that the resultant displacement is from 202 to 202' as desired. Here the rotation about the work axis 203 and about the cradle axis 201 are geared to one another and are in constant proportion to one another. As before, the two axes of relative motion are angularly disposed to one another, but here the axis 201 about which the swinging motion takes place is offset from the sphere center 202. 207 (Fig. 25) denotes the path of a point in the cutter at a mean position in the generation of a helical tooth side of the work.

In Fig. 26, I have illustrated diagrammatically, the construction of a machine built especially for practicing the process of the present invention. Here the cutter or grinding wheel is denoted at 210. It is secured to a spindle (not shown) which may be driven by a motor or other suitable driving means. The spindle is journaled in a slide 211 which in turn is mounted on a swivel plate 212 for adjustment thereon in the direction of the axis of the cutter or wheel so as to permit of compensating for wear of the wheel or sharpening of the cutter. The swivel plate 212 is mounted on a sliding base 213 for movement on circular arcuate guide ways 214 to swing about an axis 215 which is perpendicular to cutter axis 221. The sliding base 213 is reciprocable on ways 216 of the bed 217 of the machine.

In this embodiment of the invention, both the depth feed and the rocking motion are imparted to the cutter or wheel 210. The feed movement is produced by a feed cam 218 which is of the barrel type and which makes one revolution per tooth cycle. This cam moves a lever 219 which is pivoted on the bed 217 at 220. The lever 219 is connected with the sliding base 213 by an adjustable block 222, which engages a slot provided in the cam lever. The barrel cam 218 is mounted on a shaft 223 to which there is also secured a cam 224. This cam engages a roller 225 which is carried by a lever 226. The lever 226 is connected by a fine tooth clutch 227 to a shaft 228 which is journaled in the machine bed 217. There is a bevel pinion 229 mounted in the sliding base 213 on this shaft 228 and having a sliding splined connection therewith. This pinion meshes with a bevel gear segment 230 which is secured to the under side of the swivel plate 212 concentric with the pivot 215. The rotation of the cam 224, therefore, rocks the pinion 229 and the swivel plate 212.

A work piece 235, which is to be cut or ground, is secured to a work spindle whose axis is denoted at 231. The work spindle is journaled in a work head which is adjustable about an axis 232 which is also mounted for lateral adjustment on the bed of the machine in a direction of the arrow 233. The work head is also adjustable in the direction of the axis 231 of the work spindle and preferably also in the direction of the axis of the pivot 232. For generating helical surfaces on the work, the work axis 231 is adjusted to be parallel to the direction of the sliding base 213. The machine is then arranged so that the cam shaft 223 will be driven in time with the rotation of the work on its axis 231 so as to impart combined feed and rocking movements to the tool in time with the work rotation and generate correct helical surfaces on the work.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of generating a helical side tooth surface on a face clutch or the like which comprises moving a side-cutting tool across the face of the work while effecting relative movement between the tool and work about two axes angularly disposed to one another, and simultaneously therewith effecting relative movement between the tool and work in the direction of tooth depth.

2. The method of generating a helical side tooth surface on a face clutch or the like which comprises moving a side-cutting tool across the face of the work while effecting relative movement between the tool and work about two axes which are angularly disposed to and offset from one another, and simultaneously therewith effecting relative movement between the tool and blank in the direction of tooth depth.

3. The method of generating a helical side tooth surface on a face clutch or the like which comprises moving a side-cutting tool across the face of the work while effecting a relative movement between the tool and the work about and in the direction of the work axis, and simultaneously producing a relative rocking movement between the tool and the work in the direction of tooth depth so as to cause the side-cutting edge of the tool to generate the tooth side from top to bottom thereof.

4. The method of generating a helical side tooth surface on a toothed face member which comprises rotating a cutting tool that has a convex side-cutting surface in engagement with the work while effecting a relative helical movement between the tool and work and simultaneously therewith producing a relative rocking movement between the tool and work about an axis inclined to the tool axis to cause the tool to generate said helical side tooth surface for its full depth.

5. The method of producing opposite sides of a tooth space of a saw-tooth clutch member which comprises employing a cutting tool which has side-cutting surfaces at opposite sides and rotating said tool in engagement with the work while rotating the work on its axis and effecting a relative depthwise feed movement between the tool and work in time with the work rotation and in the direction of the work axis, and while simultaneously producing a relative rocking movement between the tool and work about an axis inclined to the tool axis to cause the side-cutting surface at one side of the tool to generate a helical side surface at one side of the tooth space for the full depth thereof, and then allowing the tool to dwell in full-depth position long enough for the opposite side-cutting surface of the tool to finish the opposite side of the tooth space.

6. The method of producing opposite sides of a tooth space of a saw-tooth clutch member which comprises employing a disc cutting tool which has a side-cutting surface of convex profile shape and relatively large pressure angle at one side and a side-cutting surface of smaller pressure angle at the opposite side, and rotating said tool in engagement with the work while rotating the work on its axis and effecting a relative depthwise feed movement between the tool and the work in time with the work rotation and in the direction of the work axis, and while simultaneously producing a relative rocking movement between the tool and work about an axis inclined to the axes of both the tool and work to cause the convex side cutting surface of the tool to generate a helical side surface at one side of the tooth space for the full depth thereof, and allowing the tool to dwell in full-depth position long enough for the opposite side-cutting surface of the tool to finish the opposite side of the tooth space.

7. The method of producing opposite sides of a tooth space of a saw-tooth clutch member which comprises employing a cutting tool which has side-cutting surfaces at opposite sides, one side being of convex spherical shape, and rotating said tool in engagement with the work while rotating the work on its axis and effecting a relative depthwise feed movement between the tool and work in time with the work rotation and in the direction of the work axis, and while simultaneously producing a relative rocking movement between the tool and work about an axis perpendicular to the work axis and passing through the center of the spherical surface to cause the spherical surface to generate a helical side surface at one side of the tooth space for the full height thereof, and allowing the tool to dwell in full-depth position long enough for the opposite side of the tool to finish the opposite side of the tooth space.

8. The method of producing opposite sides of a tooth space of a saw-tooth clutch or the like which comprises employing a rotary tool which has a convex cutting surface at one side and a straight-profiled cutting surface at its opposite side, and rotating said tool in engagement with the work while effecting rotation of the work on its axis and in time therewith a relative feed movement between the tool and work in the direction of the work axis, and simultaneously producing a relative rocking movement between the tool and work about an axis perpendicular to the tool axis to cause the convex cutting surface of the tool to generate a helical side tooth surface on the work from top to bottom thereof, and allowing the tool to dwell at full depth position long enough for the straight side-cutting surface of the tool to finish the opposite side of the tooth space.

9. The method of producing opposite sides of a tooth space of a saw-tooth clutch member or the like which comprises employing a disc-type rotary tool which has a convex spherical cutting surface of relatively large pressure angle at one side and a conical cutting surface of negative pressure angle at its opposite side, and rotating said tool in engagement with the work while effecting rotation of the work on its axis at a uniform rate and in time therewith a relative feed movement between the tool and work in the direction of the work axis at a uniform rate, and simultaneously producing a relative rocking movement between the tool and work about an axis passing through the center of the spherical surface and perpendicular to the work axis to cause the spherical cutting surface to cut a helical side surface on the work from top to bottom thereof, and allowing the tool to dwell at full depth position long enough for the opposite side surface of the tool to finish the opposite side of the tooth space as a surface of revolution.

10. The method of producing tooth surfaces of a toothed face clutch member which comprises positioning a rotary cutting tool, whose cutting portions extend in the general direction of its axis, in engagement with the work, so as to operate in two spaced tooth zones of the work simultaneously, and rotating the tool in engagement with the work while rotating the work on its axis, and effecting a relative depthwise feed movement between the tool and work first in one direction and then in the other in time with the work rotation, and simultaneously therewith producing a relative rocking motion between tool and work about an axis inclined to the tool axis which is in one direction during the in-feed movement and in the opposite direction during the out-feed movement, whereby to cut one side of a tooth of the work during feed in one direction and the opposite side of a tooth spaced from the first tooth during feed in the opposite direction.

11. The method of producing a toothed face clutch member which comprises positioning a cutting tool, whose cutting portion extends in the general direction of its axis and which has an outside cutting surface of convex profile shape, in engagement with the work so that the tool will operate in two spaced tooth zones of the work simultaneously, and rotating the tool in engagement with the work while rotating the work on its axis and while effecting a relative feed movement between the tool and work in the direction of the work axis and in time with the work rotation, and simultaneously producing a relative rocking movement between the tool and work about an axis inclined to the tool and work axes until full depth position is reached to cut one side tooth surface of the work, then reversing the direction of the feed and rocking motions while continuing to rotate the work in the same direction as before to cut the opposite side of a spaced tooth of the work.

12. The method of producing a toothed face clutch member which comprises positioning a cutting tool, which has a spherical cutting surface, in engagement with the work so that it will operate in two spaced tooth zones of the work simultaneously, and rotating the tool in engagement with the work while rotating the work on its axis and effecting a relative feed movement between the tool and work axially of the work at a uniform rate in time with the work rotation and simultaneously producing a relative rocking movement between the tool and work about an axis passing through the center of said spherical cutting surface until full depth position is reached, then reversing the direction of the feed motion and of the rocking motion but continuing the direction of the work rotation until the opposite side of a spaced tooth of the clutch member has been finished.

13. The method of producing a toothed face clutch member which comprises positioning a tool, which has a convex side cutting surface extending in the general direction of the axis of the tool, so that the tool will operate in two spaced tooth zones of the work simultaneously, and rotating the tool on its axis while rotating the work on its axis and while effecting a relative feed movement between the tool and work in the direction of the work axis and in time with the work rotation, and simultaneously producing a relative rocking movement between the tool and work about an axis inclined to the tool axis until full-depth position is reached to cut one side tooth surface of the work, and then reversing the directions of the feed and rocking motions but continuing the direction of the work rotation to cut the opposite side surface of a spaced tooth of the work, and indexing the work when the tool is clear of the work at the end of the out-feed movement, the rocking movement being so timed to the feed movement that at full depth position, the axis of the tool is parallel to the axis of the work.

14. In a machine for producing face clutches and the like, a work support, a tool support, a rotary tool journaled in the tool support, means for rotating the tool on its axis, means for rotating the work on its axis, means for effecting a relative feed movement between the tool and work supports in time with the tool rotation, and means for simultaneously effecting a relative swinging movement between the tool and work about an axis perpendicular to the tool and work axes.

15. In a machine for producing face clutches and the like, a work support, a tool support, a rotary tool journaled in the tool support, means for rotating the tool on its axis, means for rotating the work on its axis, means for effecting a relative feed movement between the tool and work in the direction of the work axis in time with the tool rotation, and means for simultaneously producing a relative swinging movement between the tool and work about an axis perpendicular to and intersecting the tool axis.

16. The method of generating a helical side tooth surface on a toothed face member which comprises rotating a cutting tool, that has a convex side cutting surface, in engagement with the work while effecting a relative helical movement between the tool and work and simultaneously therewith producing a relative rocking movement between the tool and work about an axis inclined to the work axis to cause the tool to generate said helical side tooth surface for its full depth.

17. The method of producing opposite sides of a tooth space of a saw-tooth clutch member which comprises employing a disc cutting tool which has a side cutting surface of convex profile shape and relatively large pressure angle at one side and an internal conical cutting surface at its opposite side, and rotating said tool in engagement with the work while rotating the work on its axis, and effecting a relative feed movement between the tool and the work in time with the work rotation and in the direction of tooth depth, and while simultaneously producing a relative rocking movement between the tool and work about an axis inclined to the axes of both the tool and work to cause the convex side cutting surface of the tool to generate a helical side surface at one side of the tooth space for the full depth thereof, and then allowing the tool to dwell in full depth position long enough for the opposite side cutting surface of the tool to finish the opposite side of the tooth space.

18. The method of generating a helical side tooth surface on a face clutch or the like which comprises moving a side cutting tool, that has a side cutting edge of positive pressure angle, across the face of the work while rotating the work on its axis and effecting a relative feed movement between the tool and work in the direction of tooth depth, and while simultaneously effecting a relative swinging movement between the tool and work about an axis inclined to the work axis.

19. The method of generating a helical side tooth surface on a face clutch or the like which comprises rotating a tool, that has an effective side cutting surface at one side which is inclined to the tool axis, in engagement with the work while rotating the work on its axis and effecting a relative feed movement between the tool and work in the direction of tooth depth, and while simultaneously effecting a relative swinging movement between the tool and work about an axis inclined to both the tool and work axes.

20. The method of generating a helical side tooth surface on a face clutch or the like which comprises rotating a tool, that has an effective side cutting surface at one side which is inclined to the tool axis, in engagement with the work while effecting a relative helical movement between the tool and work about and in the direction of the work axis and while effecting a relative swinging movement between the tool and work about an axis inclined to both the tool and work axes.

21. The method of generating a helical side tooth surface on a face clutch or the like which comprises rotating a tool, that has an effective side cutting surface at one side inclined to the tool axis, in engagement with the work, while effecting a relative helical movement between the tool and work about and in the direction of the work axis, and while effecting a relative swinging movement between the tool and work about an axis which is perpendicular to both the tool and work axes.

22. The method of generating a helical side tooth surface on a face clutch or the like which comprises moving a side cutting tool, that has an effective side cutting surface of convex spherical shape, across the face of the work while rotating the work on its axis and effecting a relative feed movement between the tool and work in the direction of tooth depth, and while simultaneously effecting a relative swinging movement between the tool and work about an axis passing through the center of said spherical cutting surface.

23. The method of generating a helical side tooth surface on a face clutch or the like which comprises rotating a tool, that has an effective side cutting surface whose profile is inclined to the tool axis, in engagement with the work while rotating the work on its axis and effecting a relative feed movement between the tool and work in the direction of tooth depth, and while simultaneously effecting a relative swinging movement between the tool and work about an axis inclined to both the tool and work axes, the tool rotation being timed to the feed and swinging motions.

24. In a machine for producing face clutches and the like, a work support, a tool support, a rotary tool journaled in the tool support, a slide on which the tool support is oscillatably mounted, means for rotating the tool on its axis, means for rotating the work support on its axis, means for oscillating the tool support, and means for reciprocating the slide in time with the work and tool support movements.

25. In a machine for producing face clutches and the like, a work support, a tool support, a rotary tool journaled in the tool support, a slide on which the tool support is mounted for oscillation about an axis perpendicular to the axis of the tool, means for rotating the tool on its axis, means for rotating the work support on its axis, means for oscillating the tool support, and means for reciprocating the slide in time with the work and tool support movements.

26. In a machine for producing face clutches and the like, a work support, a tool support, a rotary tool journaled in the tool support, a slide on which the tool support is oscillatably mounted, means for rotating the tool on its axis, means for rotating the work support on its axis, separate cams operatively connected to the slide and tool support and adapted on rotation to effect reciprocation of the slide and oscillation of the tool support, a shaft on which both of said cams are mounted, and means for driving said shaft in time with the rotation of the work support.

27. The method of generating a side tooth surface of a toothed face clutch member or the like, which comprises rotating a tool, which has an effective convex spherical cutting surface, in engagement with the work, while effecting a relative rectilinear feed motion between the tool and work in the direction of the work axis, and simultaneously producing an additional motion between the tool and work about an axis offset from and angularly disposed to the work axis.

28. The method of generating a side tooth surface of a toothed face clutch member or the like which comprises rotating a tool, which has an effective convex spherical cutting surface, in engagement with the work while effecting a relative feed motion between the tool and work in the direction of the work axis, and simultaneously producing an additional motion between the tool and work about an axis offset from the work axis and disposed at right angles thereto.

29. The method of generating a side tooth surface of a toothed face clutch member or the like, which comprises rotating a tool, that has an effective convex spherical cutting surface, in engagement with the work while effecting a relative feed movement between the tool and work in the direction of the work axis and simultaneously producing an additional motion between the tool and work about an axis passing through the center of the spherical cutting surface of the tool and offset from and extending at right angles to the work axis.

30. The method of generating a helical side tooth surface on a face clutch or the like which comprises rotating a tool, that has an effective side cutting surface at one side inclined to the tool axis, in engagement with the work, while effecting a relative helical movement between the tool and work about and in the direction of the work axis, and while effecting a relative swinging movement between the tool and work about an axis which is perpendicular to the tool axis.

31. The method of generating a helical side tooth surface on a face clutch or the like which comprises rotating a tool, that has an effective side cutting surface at one side inclined to the tool axis, in engagement with the work, while effecting a relative helical movement between the tool and work about and in the direction of the work axis, and while effecting a relative swinging movement between the tool and work about an axis which is perpendicular to the work axis.

ERNEST WILDHABER.

REFERENCES CITED

The following references are of record in the file of this patent:

UNITED STATES PATENTS

| Number | Name | Date |
| --- | --- | --- |
| 1,622,014 | Wildhaber | Mar. 22, 1927 |
| 1,625,402 | Sloan | Apr. 19, 1927 |
| 1,788,639 | Stonebraker | Jan. 13, 1931 |
| 1,964,800 | Hill | July 3, 1934 |
| 2,044,485 | Schauseil et al. | June 16, 1936 |
| 2,125,943 | McMullen et al. | Aug. 9, 1938 |
| 2,334,336 | Wildhaber | Nov. 16, 1943 |
| 2,346,806 | Wildhaber | Apr. 18, 1944 |